United States Patent
Pecquet et al.

(12)

(10) Patent No.: US 11,131,587 B2
(45) Date of Patent: Sep. 28, 2021

(54) TEMPERATURE SENSOR WITH HEAT TRANSFER ELEMENT AND FABRICATION METHOD

(71) Applicant: MEAS France, Toulouse (FR)

(72) Inventors: Nicolas Christophe R. Pecquet, Doue (FR); Hamza Boumeddane, Villenoy (FR)

(73) Assignee: MEAS FRANCE, Toulouse (FR)

( * ) Notice: Subject to any disclaimer, the term of this patent is extended or adjusted under 35 U.S.C. 154(b) by 275 days.

(21) Appl. No.: 15/633,008

(22) Filed: Jun. 26, 2017

(65) Prior Publication Data
US 2017/0370782 A1     Dec. 28, 2017

(30) Foreign Application Priority Data
Jun. 27, 2016    (EP) ..................................... 16305776

(51) Int. Cl.
| | | |
|---|---|---|
| *G01K 1/16* | (2006.01) | |
| *G01K 7/08* | (2006.01) | |
| *G01K 1/18* | (2006.01) | |
| *G01K 7/18* | (2006.01) | |
| *G01K 1/08* | (2021.01) | |
| *G01K 1/00* | (2006.01) | |
| *G01K 7/02* | (2021.01) | |
| *G01K 7/16* | (2006.01) | |

(Continued)

(52) U.S. Cl.
CPC ................. *G01K 7/08* (2013.01); *G01K 1/00* (2013.01); *G01K 1/08* (2013.01); *G01K 1/16* (2013.01); *G01K 1/18* (2013.01); *G01K 7/02* (2013.01); *G01K 7/16* (2013.01); *G01K 7/18* (2013.01); *G01N 27/18* (2013.01); *G01K 13/223* (2021.01)

(58) Field of Classification Search
CPC ............. G01K 1/16; G01K 1/165; G01K 1/18
See application file for complete search history.

(56) References Cited

U.S. PATENT DOCUMENTS 2,415,187 A * 2/1947 Moore ..................... G01K 1/18
                                                                  338/28
2,524,894 A * 10/1950 Dobrin .................... G01K 1/14
                                                                 374/194

(Continued)

FOREIGN PATENT DOCUMENTS

| CN | 203432706 U | 2/2014 |
|---|---|---|
| DE | 1648188 A1 | 10/1971 |

(Continued)

OTHER PUBLICATIONS

English Translation of DE 10158527, Aug. 2002.*
(Continued)

*Primary Examiner* — Alexander A Mercado

(57) ABSTRACT

A temperature sensor comprises a temperature sensing element, a protective housing, and a heat transfer element. The temperature sensing element transduces a sensed temperature into an electrical output signal. The protective housing at least partly encases the temperature sensing element. The heat transfer element has an outer surface in heat conductive contact with an inner wall of the protective housing and receives at least a part of the temperature sensing element. The heat transfer element is formed separately from the temperature sensing element.

10 Claims, 5 Drawing Sheets

(51) Int. Cl.
*G01N 27/18* (2006.01)
*G01K 13/20* (2021.01)

(56) References Cited

U.S. PATENT DOCUMENTS

| | | | | |
|---|---|---|---|---|
| 2,639,189 A * | 5/1953 | Bragg | | G01K 11/04 |
| | | | | 374/159 |
| 2,957,153 A * | 10/1960 | Greenberg | | H01C 1/028 |
| | | | | 338/28 |
| 3,592,059 A * | 7/1971 | Chilton | | G01K 13/002 |
| | | | | 374/165 |
| 4,356,061 A * | 10/1982 | Smith | | G01K 1/20 |
| | | | | 376/254 |
| 4,403,653 A * | 9/1983 | Davidson | | F28F 13/14 |
| | | | | 165/170 |
| 4,721,534 A | 1/1988 | Phillippi et al. | | |
| 5,709,474 A * | 1/1998 | Richardson | | G01K 1/105 |
| | | | | 136/234 |
| 6,220,750 B1 * | 4/2001 | Palti | | G01K 1/16 |
| | | | | 374/164 |
| 7,553,078 B2 * | 6/2009 | Hanzawa | | G01K 1/08 |
| | | | | 338/22 R |
| 7,817,010 B2 | 10/2010 | Nyffenegger | | |
| 2006/0013282 A1 * | 1/2006 | Hanzawa | | G01K 1/08 |
| | | | | 374/163 |
| 2007/0195857 A1 * | 8/2007 | Krishnamurthy | | G01K 1/16 |
| | | | | 374/148 |
| 2016/0161346 A1 * | 6/2016 | Schorb | | G01K 11/3206 |
| | | | | 374/161 |
| 2017/0016775 A1 * | 1/2017 | Decker | | G01K 1/16 |
| 2017/0218542 A1 * | 8/2017 | Stewart | | D04B 21/12 |
| 2017/0231415 A1 * | 8/2017 | Cheng | | A47J 27/002 |
| | | | | 374/141 |

FOREIGN PATENT DOCUMENTS

| | | | | |
|---|---|---|---|---|
| DE | 10158527 | A1 | 8/2002 | |
| DE | 202015103789 | U1 * | 7/2015 | ............ G01K 1/08 |
| FR | 2348550 | A1 | 11/1977 | |
| FR | 2880685 | A1 | 7/2006 | |
| GB | 1152149 | A | 5/1969 | |
| GB | 2147737 | A | 5/1985 | |
| JP | 19800167134 | | 5/1954 | |
| JP | 1975016616 | | 5/1975 | |
| JP | S50016616 | Y | 5/1975 | |
| JP | S55167134 | A | 12/1980 | |
| JP | 1988314427 | | 12/1988 | |
| JP | S63314427 | A | 12/1988 | |
| JP | 05164624 | A | 6/1993 | |
| JP | H08261846 | A | 10/1996 | |
| JP | 4269512 | B2 | 5/2009 | |
| KR | 20120069706 | A | 6/2012 | |

OTHER PUBLICATIONS

Thermal Conductivity of Metals, Metallic Elements and Alloys, (n.d.). Retrieved Jan. 8, 2020, from https://www.engineeringtoolbox.com/thermal-conductivity-metals-d_858.html.*
Nickel Alloys . Net, Everything You Wanted To Know About Nickel Alloys, (n.d.). Retrieved Feb. 1, 2020, from https://www.nickel-alloys.net/nickel_and_nickel_alloys.html.*
European Search Report, dated Dec. 16, 2016, 11 pages.
1st Japanese Office Action in Patent Appln. No. 2017-121817, dated Oct. 27, 2020, and English translation thereof, 22 pp.

* cited by examiner

US 11,131,587 B2

TEMPERATURE SENSOR WITH HEAT TRANSFER ELEMENT AND FABRICATION METHOD

CROSS-REFERENCE TO RELATED APPLICATION

This application claims the benefit of the filing date under 35 U.S.C. § 119(a)-(d) of European Patent Application No. 16305776.3, filed on Jun. 27, 2016.

FIELD OF THE INVENTION

The present invention relates to a temperature sensor and, more particularly, to a temperature sensor used for monitoring high temperatures.

BACKGROUND

Temperature sensors which output an electrical signal representing a sensed temperature are known and used in many fields of industrial production and automotive applications. Such temperature sensors comprise an outer protective housing that is in contact with a medium to be monitored and a temperature sensitive element which is arranged inside the protective housing. The temperature sensitive element transduces the sensed temperature into the electrical output signal.

In order to achieve fast response time and an accurate measurement, it is essential that a good thermally conductive connection is formed between the temperature sensitive element and the outside medium; the temperature at the site of the temperature sensitive element should mirror the temperature outside the protective housing as closely as possible. Certain applications, such as automotive applications, require the temperature sensor to be robust to resist vibration and capable of withstanding elevated temperatures up to 1000° C. It is known to fill the space between the inner walls of the protective housing and the outer surface of the temperature sensitive element with a ceramic material, for instance a cement or powder, to meet these requirements. The ceramic material, however, impairs the thermally conductive connection between the temperature sensitive element and the outside medium, consequently impairing response time and accuracy.

SUMMARY

An object of the invention, among others, is to provide a robust temperature sensor with faster response time and improved accuracy. The temperature sensor according to the invention comprises a temperature sensing element, a protective housing, and a heat transfer element. The temperature sensing element transduces a sensed temperature into an electrical output signal. The protective housing at least partly encases the temperature sensing element. The heat transfer element has an outer surface in heat conductive contact with an inner wall of the protective housing and receives at least a part of the temperature sensing element. The heat transfer element is formed separately from the temperature sensing element.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
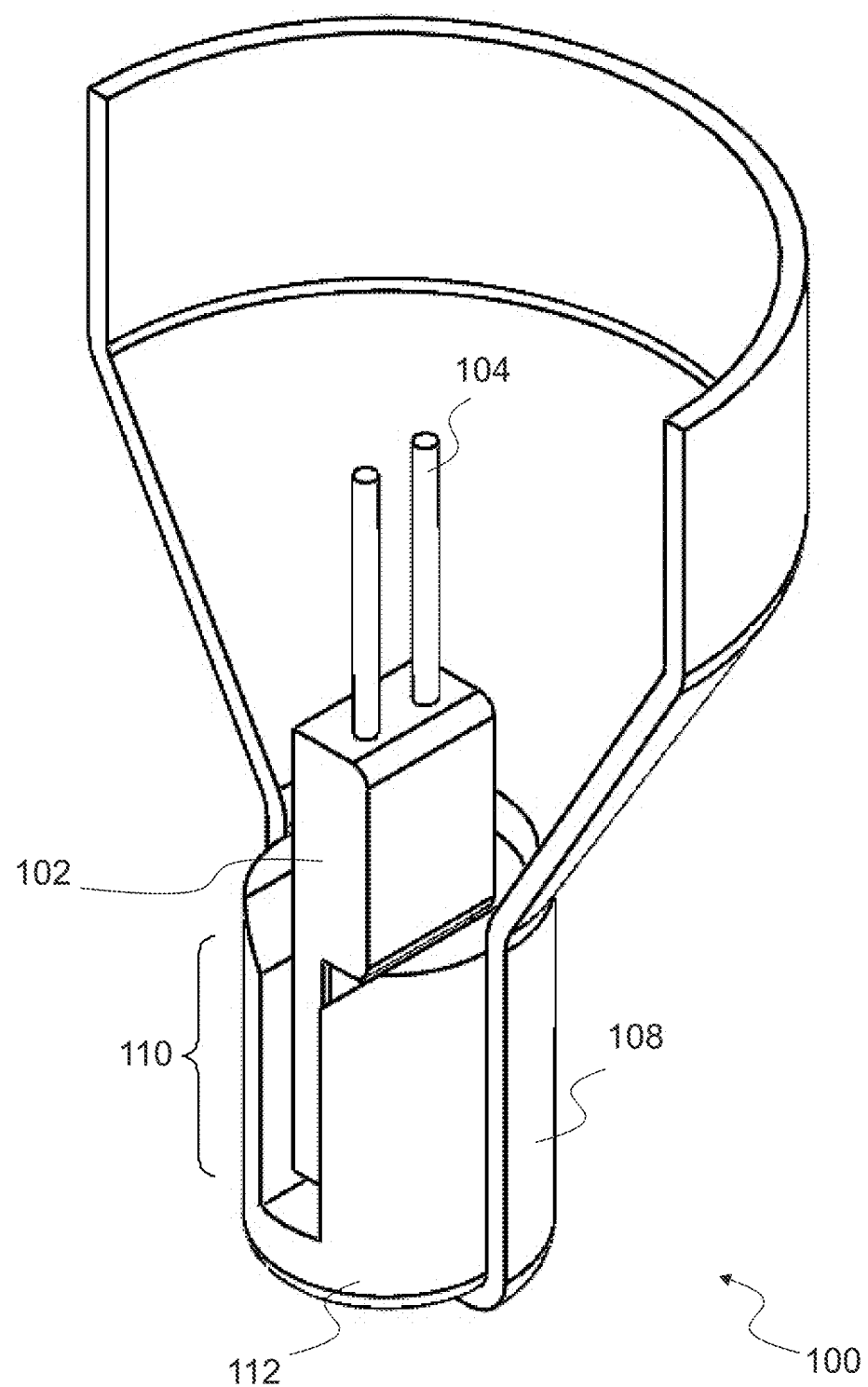
FIG. 1 is a perspective, partially sectional view of a temperature sensor according to the invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A temperature sensor 100 according to the invention is shown generally in FIG. 1. The temperature sensor 100 includes a temperature sensing element 102, a pair of electrically conductive leads 104, a protective housing 108, and a heat transfer element 112. The major components of the invention will now be described in greater detail.

In an embodiment, the temperature sensor 100 is used for measuring an exhaust gas temperature in an automobile. The temperature sensor 100 may thus be subjected to an aggressive atmosphere that might be reductive or oxidizing, contains sulfur, nitrogen, hydrogen, oxygen, and all kinds of compounds thereof. This in conjunction with the temperature determines materials for the temperature sensor 100 as described below.

The temperature sensing element 102, as shown in FIG. 1, is capable of transducing a sensed temperature into an electrical output signal. In an embodiment, the temperature sensing element 102 is a platinum temperature sensing element such as a PT 200 sensor, which is accurate and has long-term stability in the high temperature range. The platinum temperature sensing element 102 may be in the form of a thin film resistor as a platinum resistance high temperature sensor. The temperature sensing element 102 may alternatively be any other type of miniaturized temperature sensing element known to those with ordinary skill in the art, such as another type of resistive temperature detector (RTD), a thermistor, or a silicon-based semi-conductor temperature sensing element. A silicon temperature sensing element 102 is used to measure air, gases, and fluids in the temperature range of 50° C. to 150° C. A platinum temperature sensing element 102 is used to measure coolant, fuel, lubricant, brake and steering fluids in the temperature range of 55° C. to 1000° C.

The pair of electrically conductive leads 104, as shown in FIG. 1, are electrically connected to the temperature sensing element 102. The electrical output signal generated by the temperature sensing element 102 is output at the electrically conductive leads 104 which are connected to a cable (not shown). In automotive applications, the cable is a mineral insulated cable.

The protective housing 108, as shown in FIG. 1, is tube-shaped and receives the temperature sensing element 102. The protective housing 108 protects the temperature sensing element 102 against the aggressive atmosphere. In the shown embodiment, the protective housing 108 may be fabricated from metal.

The heat transfer element 112, as shown in FIG. 1, fills a space between an inner wall of the protective housing 108 and an outer surface of a transducing region 110 of the temperature sensing element 102. The heat transfer element 112 replaces the ceramic powder filling which is used with conventional temperature sensors. The heat transfer element 112 provides a heat conductive path between the inner wall of the protective housing 108 and an outer surface of the transducing region 110 of the temperature sensing element 102. The heat transfer element 112 also secures the mechanically sensitive transducing region 110 against vibrations and shock.

The heat transfer element 112 is fabricated before the assembly of the temperature sensor 100 and is, for instance, formed from an electrically conductive material. The heat transfer element 112 is fabricated from a porous metal in the shown embodiment. The heat transfer element 112 can be fabricated by any suitable technique of forming a porous metal structure known to those with ordinary skill in the art. The heat transfer element 112 may, for instance, be fabricated by means of 3D printing, machining, sintering, stamping, molding or other processes known to those with ordinary skill in the art; to form the porous metal structure, the heat transfer element 112 may be fabricated from compressed wire mesh, such as a knitted wire mesh or woven wire mesh, welded or sintered metal particles, or from a metal sponge, a cellular metal, or metal foam. Voids are present within a metallic matrix of the porous metal which leads to a mechanical flexibility that allows the absorption of shock and vibrations, while still benefiting from the superior thermal conductivity of metal. The porous metal of the heat transfer element 112 may be platinum, copper, aluminum, nickel, nickel chromium alloy, nickel silicon alloy and/or nickel chromium molybdenum niobium alloy, or other metals known to those with ordinary skill in the art, depending on the particular fabrication technique.

Figure 6:
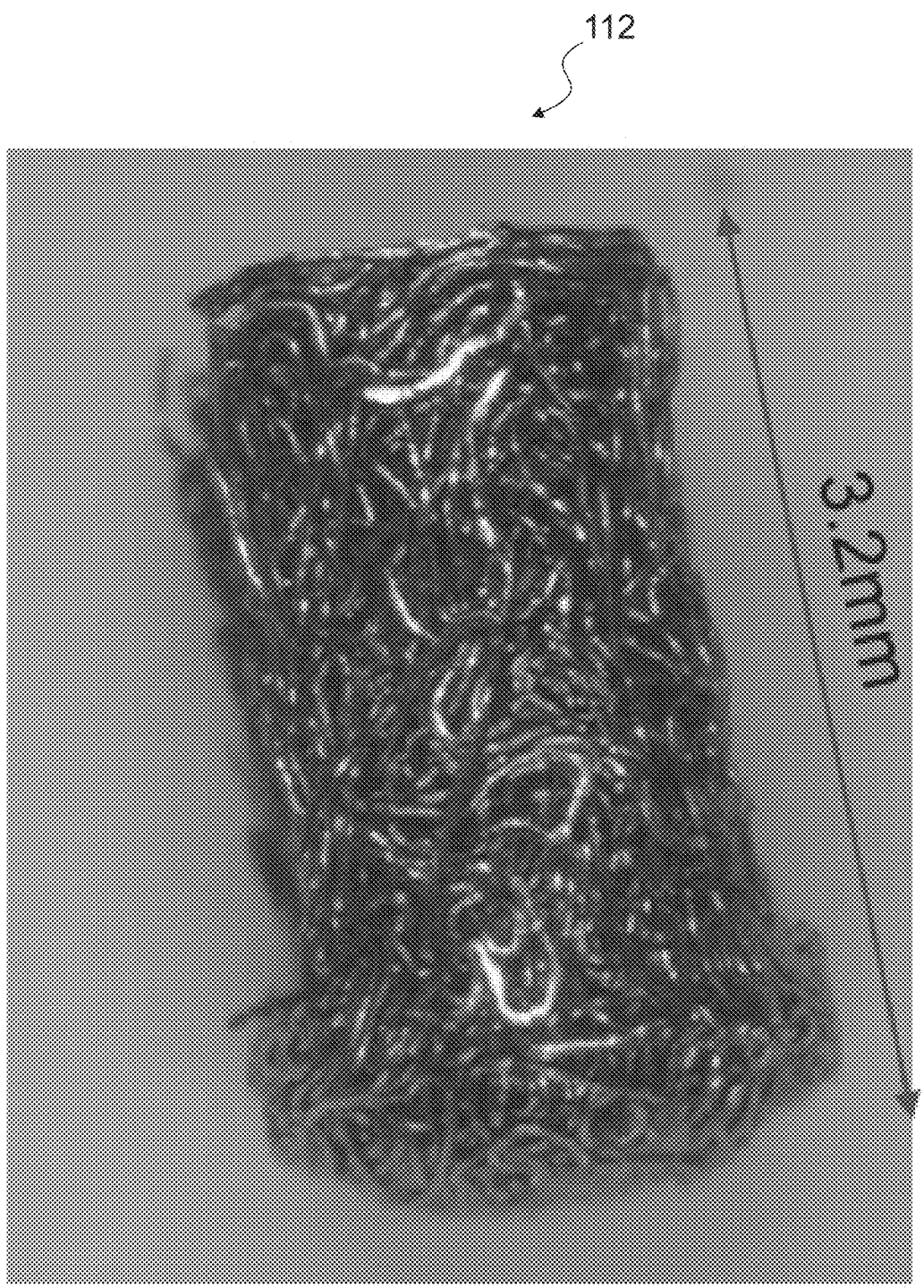
FIG. 6 is a detail perspective view of the heat transfer element of FIG. 2.

In an embodiment shown in FIG. 6, the heat transfer element 112 is fabricated from a knitted and compressed wire mesh. For instance, from an Inconel® 600 wire with a cross-sectional diameter of 0.05 mm, heat transfer elements 112 with a density of about 45% can be fabricated by compressing the knitted wire mesh. Accordingly, a percentage of voids of about 55% are present. In other embodiments, a volume of the voids may be about 50% of the heat transfer element 112. These voids may either be filled with air, an inert gas, a heat conducting fluid, or a metal oxidizing fluid. The knitting process allows producing a solid part with a single wire or a known number of wires, thereby reducing significantly the risk of loose wires compared to woven meshing. The heat transfer element 112 formed accordingly is capable of withstanding a temperature range from −40° C. to about +1100° C. The knitted wire mesh used to fabricate the heat transfer element 112 is without defects such as inclusions, lost strands, perforations, or oxidation. No lost or cut strands are present, so that the heat transfer element 112 is brought into its final form by the compression alone.

Figure 7:
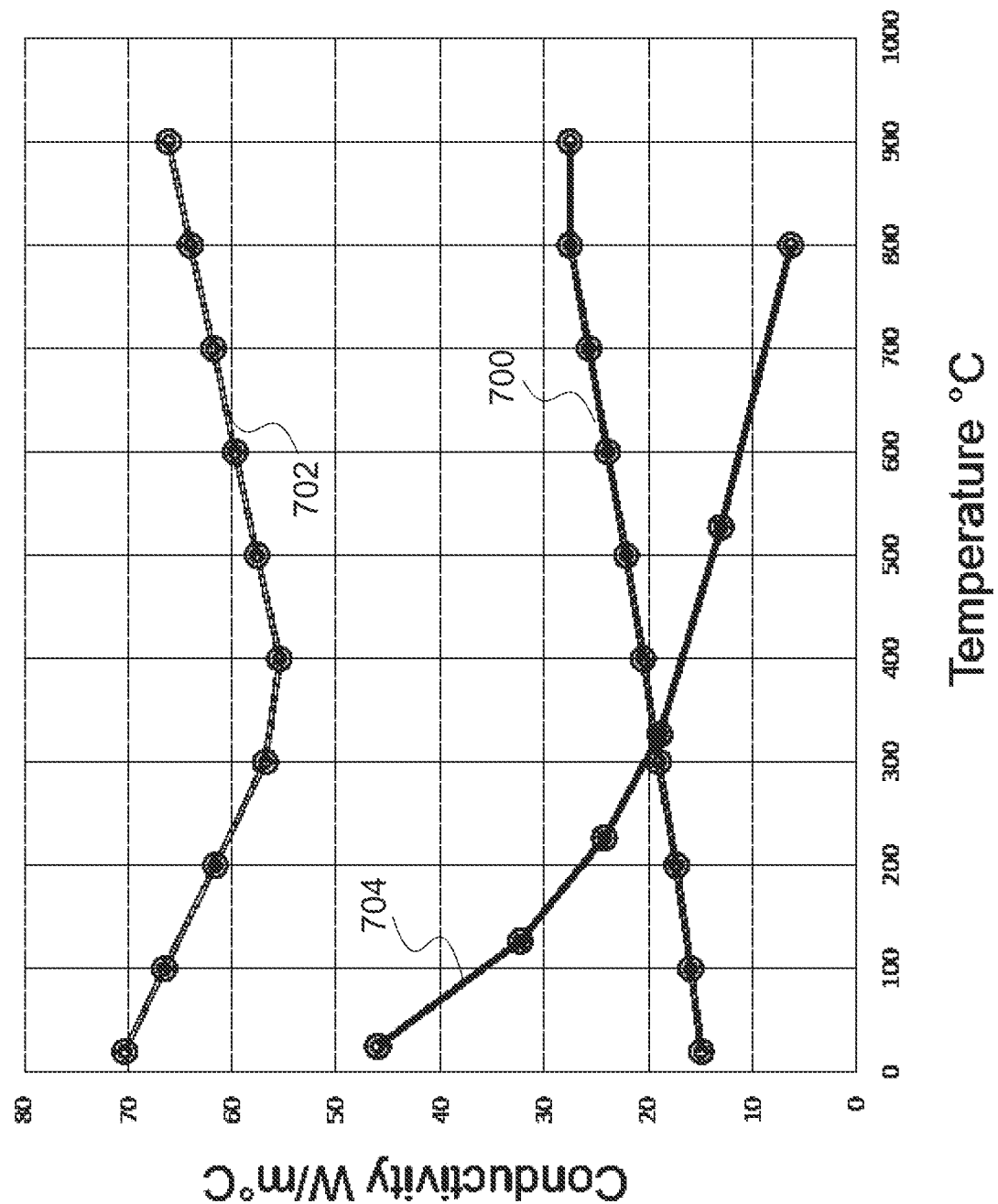
FIG. 7 is a graphical depiction of temperature heat conductivity for the heat transfer element produced from three different materials.

Knitted mesh can be fabricated from a large panel of metals. Exemplary wire materials are for instance Inconel® 600, nickel 200, Nicrosil or Nisil. FIG. 7 shows the temperature dependent thermal conductivity of the heat transfer element 112 formed from Inconel® 600 at first curve 700, nickel 200 at second curve 702, and aluminum at third curve 704. As shown in FIG. 7, nickel 200 at second curve 702 as well as Inconel® 600 at first curve 700 have thermal conductivities which rise with increasing temperature. For nickel 200 this behavior can only be found at temperatures above 400° C. Furthermore, for applications at lower temperatures, copper wire having a high thermal conductivity of up to 400 W/mK may also be used.

In order to avoid corrosion or oxidation, optional post-knit processing can be provided when fabricating the heat transfer element 112. An annealing step may also be performed after the compression has taken place.

Under other methods of fabricating the porous metal structure, the heat transfer element 112 is fabricated from inter-linked metal particles. For instance, sintered metal particles can be provided which are either compressed in the desired shape or are machined from a sintered blank. Also welding techniques such as shock welding can be used for forming a porous metal heat transfer element 112 from a metal powder. In processes such as sintered or foamed metal, it may also be advantageous to pre-fabricate a blank which is then brought into the final form by means of a machining process.

The heat transfer element 112, as shown in FIGS. 2-5 and produced according to the above-described techniques for fabricating a porous metal, includes a base region 116 and two opposing side walls 118 which extend essentially perpendicularly from the base region 116. The base region 116 and the sidewalls 118 together form a recess 120 for accommodating the transducing region 110.

Figure 4:
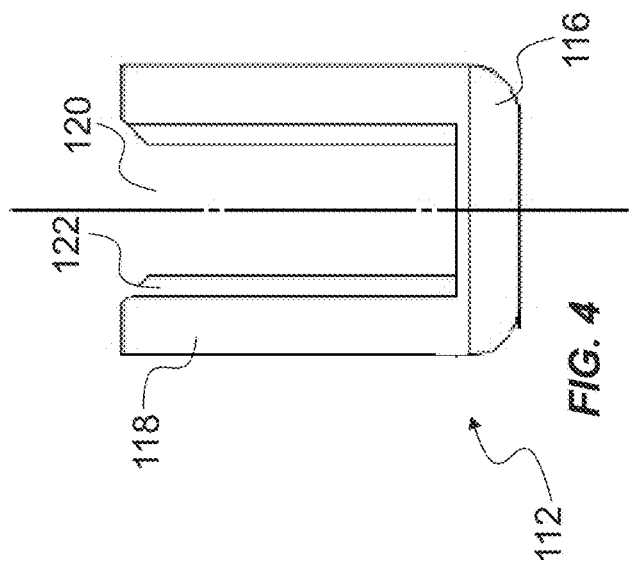
FIG. 4 is another side view of the heat transfer element of FIG. 2.
Figure 3:
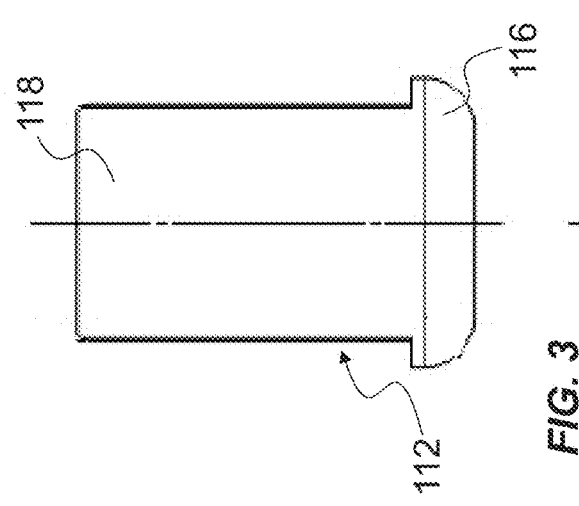
FIG. 3 is a side view of the heat transfer element of FIG. 2.
Figure 5:
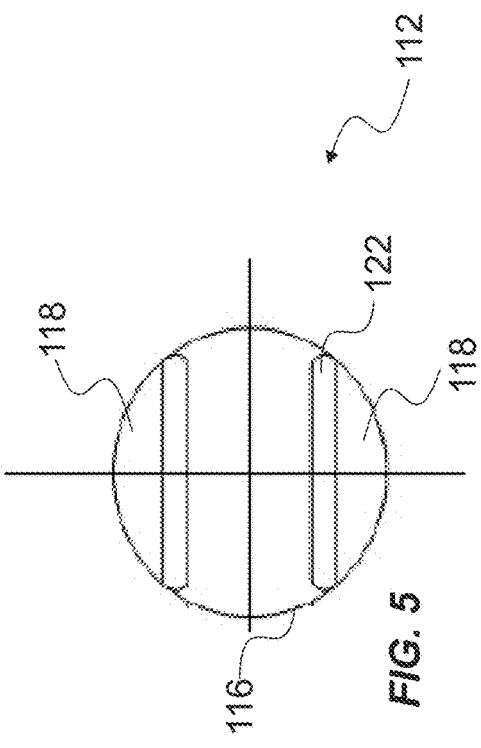
FIG. 5 is a top view of the heat transfer element of FIG. 2.
Figure 2:
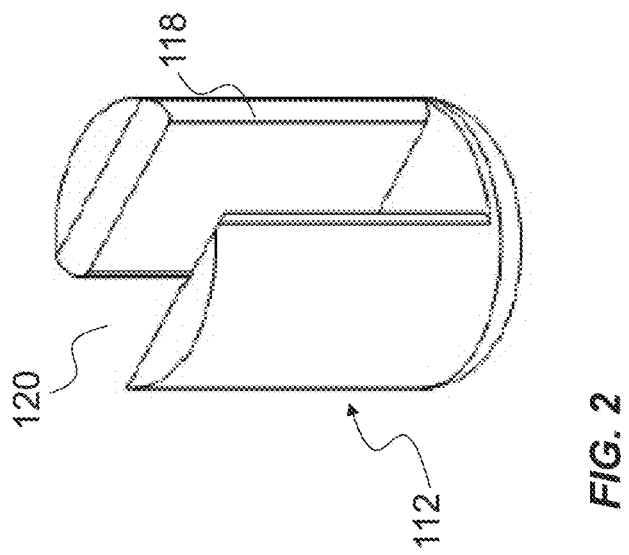
FIG. 2 is a perspective view of a heat transfer element of the temperature sensor.

The outer surface of the heat transfer element 112 is formed to match the inner surface of the protective housing 108; the heat transfer element 122 may be press-fit in the protective housing 108. In a final assembled state, the heat transfer element 112 is in heat conducting contact with the protective housing 108 and the inner walls of the sidewalls 118 are in heat conductive contact with the transducing region 110 of the temperature sensing element 102. Thereby, an efficient heat transfer from the outside environment through the protective housing 108 and the heat transfer element 112 to the transducing region 110 is achieved. As shown in FIGS. 4 and 5, the heat transfer element 112 comprises chamfered regions 122 along the edges of the side walls 118 in order to avoid damaging the temperature sensing element 102 when inserting same into the heat transfer element 112. The heat transfer element 112, as shown in FIG. 5, has an essentially cylindrical profile that fits inside the cylindrical inner space at the peripheral end of the protective housing 108.

A method for fabricating the temperature sensor 100 thus comprises providing the temperature sensing element 102 that is operable to transduce a sensed temperature into an electrical output signal, fabricating the protective housing 108 for at least partly encasing the temperature sensing element 102, fabricating the heat transfer element 112 from a porous metal, mounting the temperature sensing element 102 in the recess 120 of the heat transfer element 112, the heat transfer element 112 being formed as a sheath for receiving at least a part of the temperature sensing element 102, and assembling the protective housing 108 so that an outer surface of the heat transfer element 112 is in heat conductive contact with an inner wall of the protective housing 108.

Figure 8:
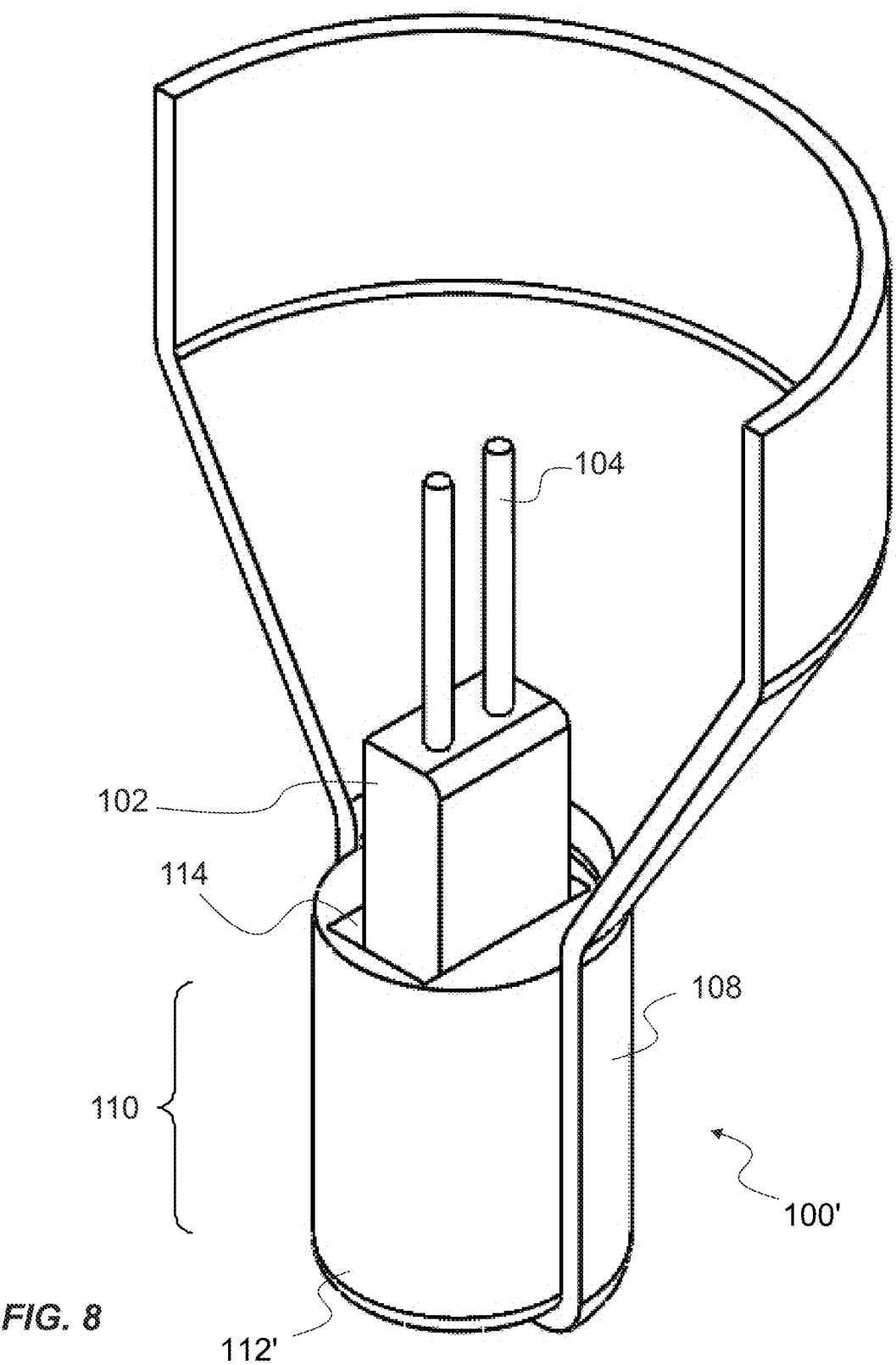
FIG. 8 is a perspective, partially sectional view of another temperature sensor according to the invention.

A temperature sensor 100' according to another embodiment of the invention is shown in FIG. 8. Like reference numbers indicate like elements. The temperature sensor 100' has a heat transfer element 112' with a closed rectangular receptacle 114 that receives the temperature sensing element 102. Apart from this difference in its form, all other features explained with reference to FIGS. 1 to 6 apply also for the embodiment shown in FIG. 8.

Advantageously, in the temperature sensor according to the present invention, the heat transfer element ensures an improved heat transfer from the closed protective tube into the temperature sensing element and dispenses with the usual ceramic cement or powder fillers. The heat transfer element can be formed before the temperature sensing element is inserted, which facilitates the fabrication process, and no powders or fluids have to be handled when assembling the temperature sensor. Moreover, replacing the conventional mineral insulated filler material by the metal knitted heat transfer element further improves the thermal conduction between the protective housing and the temperature sensing element, significantly improving response time. The porosity of the knitted mesh also allows the presence of oxygen around the temperature sensing element, which in the case of a platinum thermo-resistant element ensures a better long-term stability. Additionally, the flexibility and compressibility of the knitted mesh reduce the level of mechanical stress exerted on the temperature sensing element due to heat expansion of the involved materials.

What is claimed is:

1. A temperature sensor, comprising:
a temperature sensing element transducing a sensed temperature into an electrical output signal;
a protective housing at least partly encasing the temperature sensing element; and
a heat transfer element having an outer surface in heat conductive contact with an inner wall of the protective housing and receiving at least a part of the temperature sensing element, the heat transfer element in direct heat conductive contact with an outer surface of a transducing region of the temperature sensing element, the heat transfer element having a shape corresponding to that of the temperature sensing element including a base region and a pair of opposing side walls extending perpendicularly from the base region and defining a slot open on each lateral side extending through the heat transfer element for receiving the temperature sensing element, the heat transfer element formed from an electrically conductive porous metal as a compressed knitted wire mesh separately from the temperature sensing element, the porous metal configured to have a plurality of voids filled with air and extending uniformly between the inner wall of the protective housing and the outer surface of the transducing region of the temperature sensing element.

2. The temperature sensor of claim 1, wherein the porous metal is platinum, copper, aluminum, nickel, nickel chromium alloy, nickel silicon alloy, or nickel chromium molybdenum niobium alloy.

3. The temperature sensor of claim 1, wherein the heat transfer element has a cylindrical profile that is inserted into a cylindrical inner space of the protective housing.

4. The temperature sensor of claim 1, wherein the temperature sensing element is a resistive temperature detector, a thermistor, or a silicon-based temperature sensor.

5. The temperature sensor of claim 1, wherein the temperature sensing element is a platinum resistance temperature sensor.

6. The temperature sensor of claim 1, wherein the temperature sensing element protrudes through and beyond the side of the heat transfer element to which the slot is open.

7. The temperature sensor of claim 6, wherein the temperature sensing element extends beyond an end of each of the side walls opposite the base region in a longitudinal direction of the temperature sensing element.

8. The temperature sensor of claim 7, wherein the end of each of the opposing side walls has a chamfered region angled toward the slot in a direction of insertion of the temperature sensing element into the slot.

9. The temperature sensor of claim 1, wherein the plurality of voids of the porous metal comprise 50 to 55 percent of the volume of the heat transfer element.

10. A temperature sensor, comprising:
a temperature sensing element transducing a sensed temperature into an electrical output signal;
a protective housing at least partly encasing the temperature sensing element; and
a heat transfer element having a cylindrical profile that is inserted into a cylindrical inner space of the protective housing and including an outer surface in heat conductive contact with an inner wall of the protective housing, at least a part of the temperature sensing element inserted into a slot defined by a base region and a pair of opposing side walls of the heat transfer element, the slot extending through the heat transfer element and open on each lateral side, the heat transfer element is in direct heat conductive contact with an outer surface of a transducing region of the temperature sensing element and formed from an electrically conductive porous metal as a compressed knitted wire mesh separately from the temperature sensing element, the porous metal having a plurality of voids filled with air and extending continuously between the inner wall of the protective housing and the outer surface of the transducing region of the temperature sensing element.

* * * * *